June 17, 1941. W. L. BENNINGHOFF 2,246,237
APPARATUS FOR CUTTING THREADS
Filed Dec. 26, 1939 6 Sheets-Sheet 1
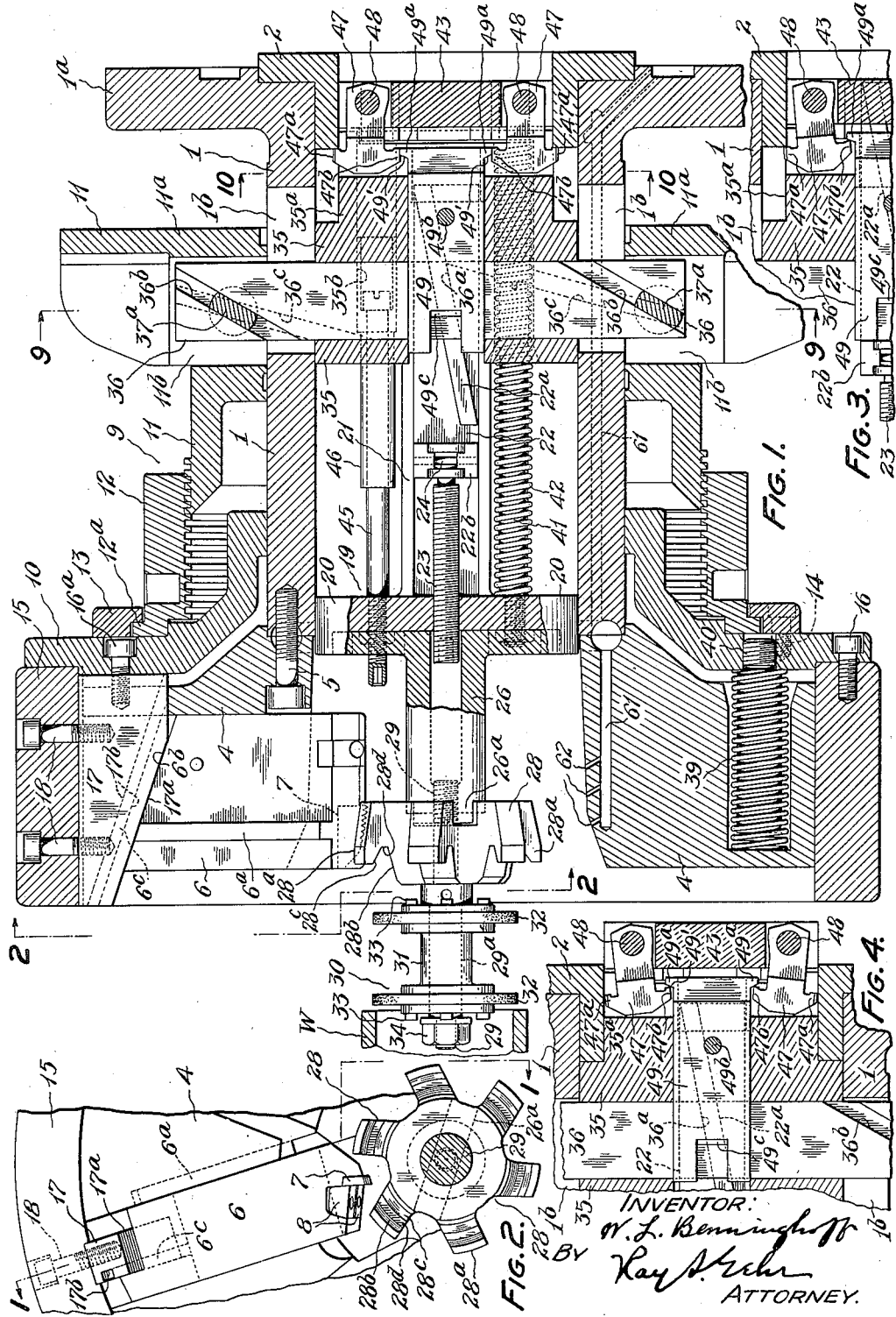

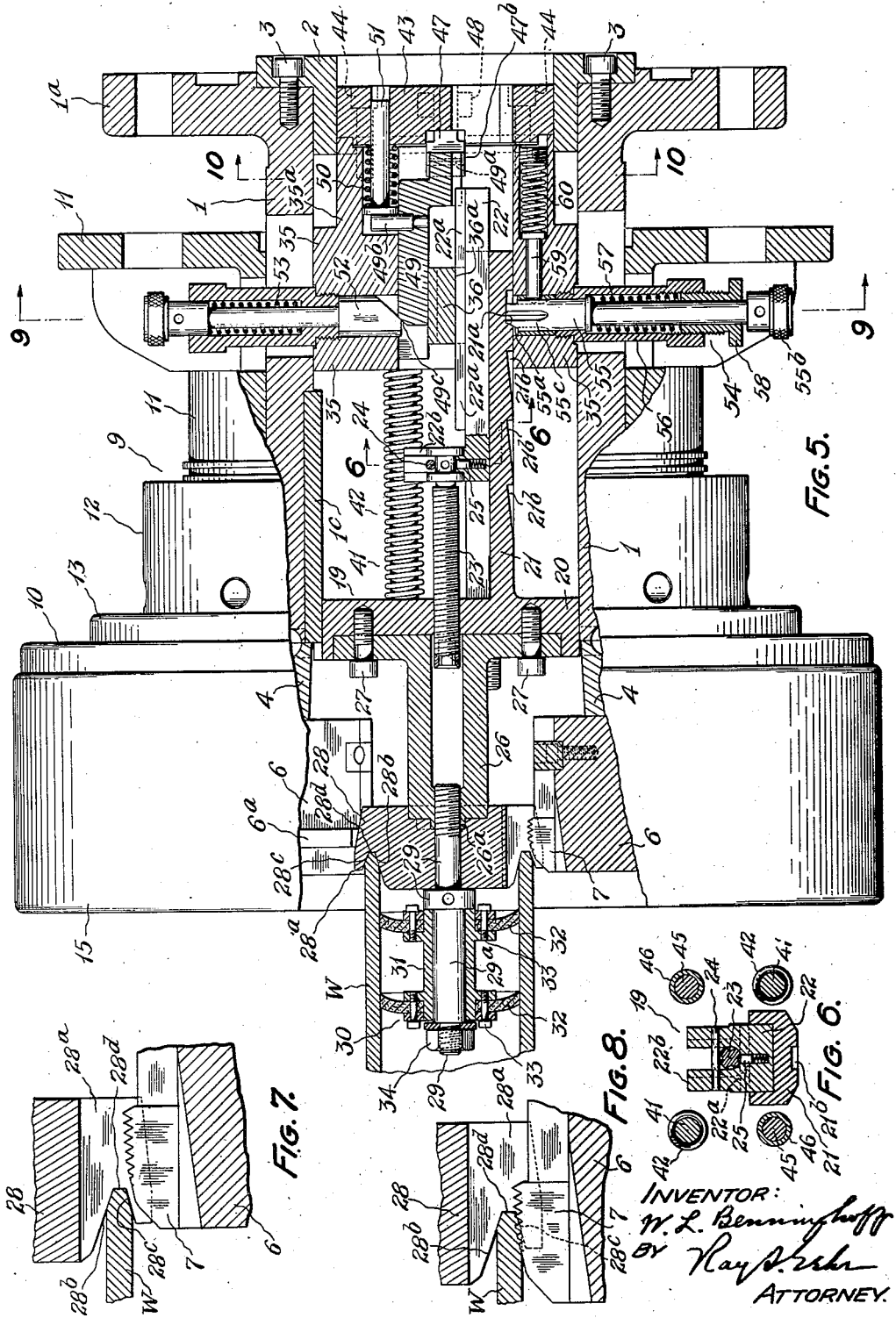

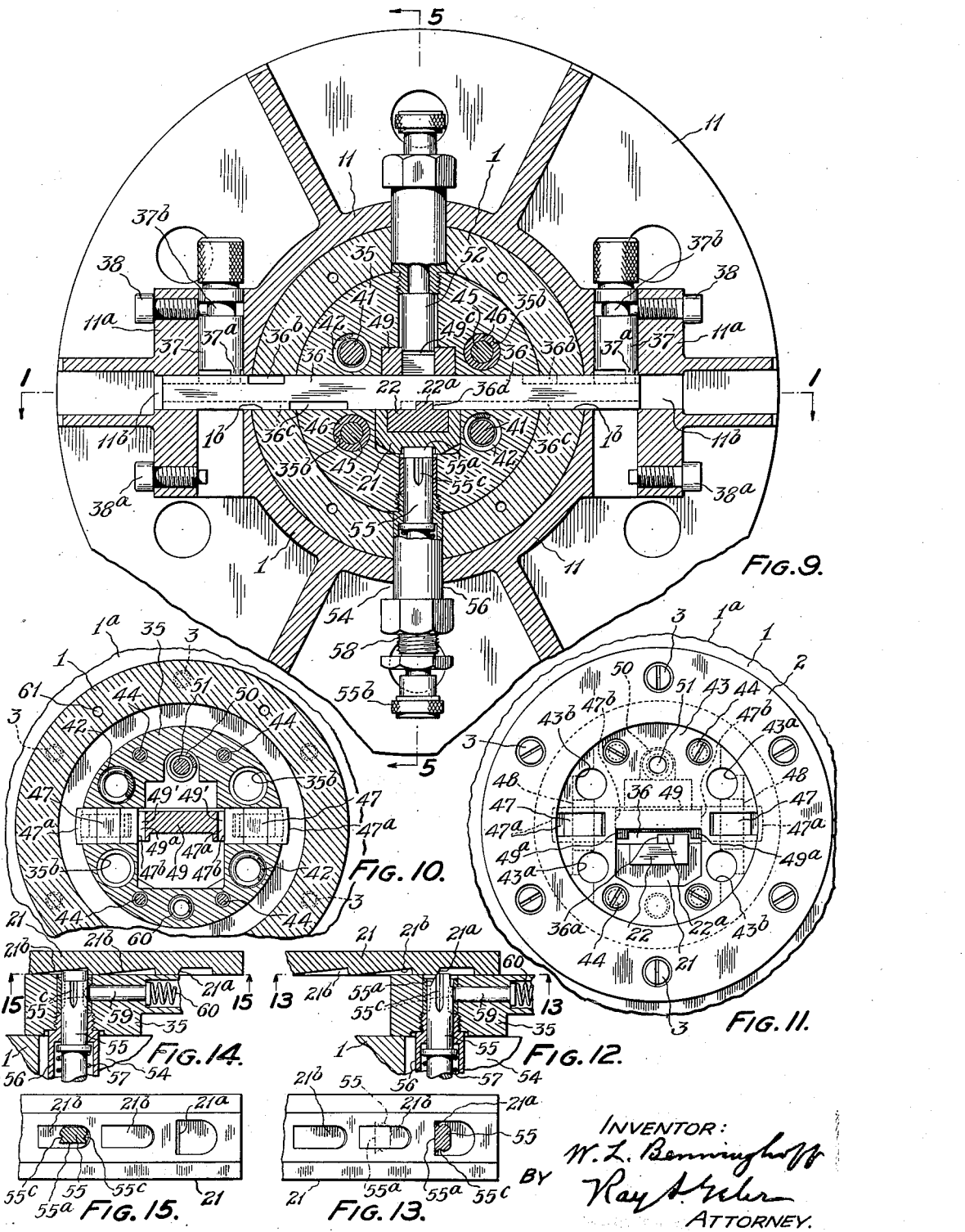

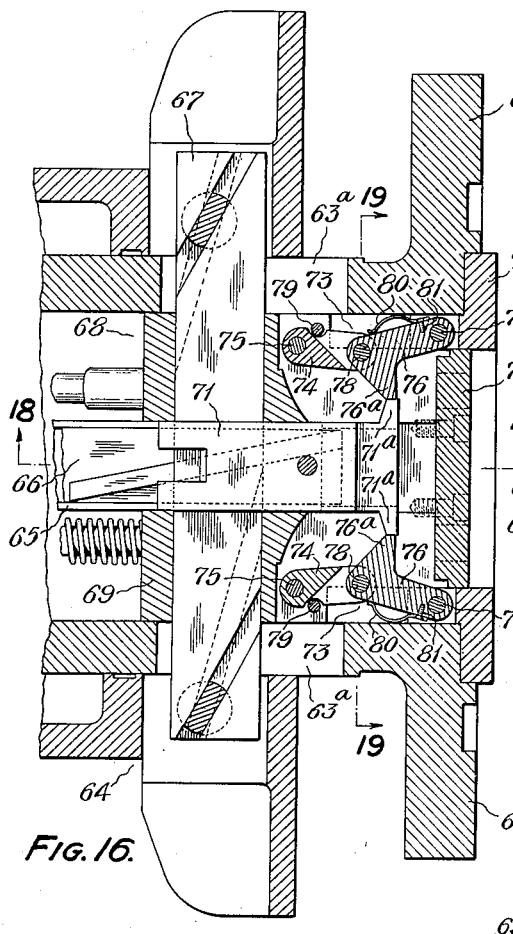

June 17, 1941.   W. L. BENNINGHOFF   2,246,237
APPARATUS FOR CUTTING THREADS
Filed Dec. 26, 1939   6 Sheets-Sheet 6

INVENTOR:
W. L. Benninghoff
BY
ATTORNEY.

Patented June 17, 1941

2,246,237

UNITED STATES PATENT OFFICE 2,246,237

APPARATUS FOR CUTTING THREADS

William L. Benninghoff, Shaker Heights, Ohio

Application December 26, 1939, Serial No. 310,899

15 Claims. (Cl. 10—120.5)

The invention relates to apparatus for cutting threads. The improvements constituting the invention are in some respects generally applicable to the cutting of either cylindrical or taper threads, in some respects especially applicable to the cutting of external taper threads by the use of chasers which gradually recede during the thread-cutting operation, and in some respects especially applicable to the threading of pipes.

An object of the invention is to provide a threading die of the receding chaser type having improved means for varying the length of the thread cut.

Another object of the invention is to provide threading tools, including threading dies of the receding chaser type, having improved mechanism for effecting the sudden retraction or collapse of the cutters at the end of the thread-cutting operation.

A further object of the invention is to provide thread-cutting apparatus of the receding chaser type having improved means for chamfering the end of the work to be threaded at the beginning of the thread-cutting operation.

The invention also has as an object the provision of pipe-threading apparatus having improved means for reducing the waste of cutting oil which has characterized prior pipe-threading apparatus with which I am familiar.

With the above recited and other ancillary or incidental objects in view, the invention consists in certain forms of construction and combinations of parts of thread-forming apparatus which are hereinafter set forth and explained, in connection with exemplary embodiments shown in the accompanying drawings and which are defined in the appended claims.

In the drawings—

Fig. 1 is an axial sectional view of a die embodying the invention with some of the parts shown in elevation, as indicated by the broken section line 1—1 of Fig. 2.

Fig. 2 is a fragmentary sectional view taken on the line 2—2 of Fig. 1.

Fig. 3 is a fragmentary sectional view taken on the same plane as Fig. 1 and showing one of the latches and cooperating parts in their relative positions when the latch is on the point of disengagement.

Fig. 4 is a fragmentary section taken on the same plane as Fig. 1 showing the parts of the latch mechanism after disengagement of the latch and retractive movement of the cutters have occurred.

Fig. 5 is a view showing the die of Fig. 1 partly in side elevation and partly in axial section, the section being perpendicular to that of Fig. 1.

Fig. 6 is a section taken on the broken line 6—6 of Fig. 5.

Fig. 7 is an enlarged fragmentary portion of the section of Fig. 5 showing the relative positions of the chamfer and thread cutters at the end of the chamfering cut.

Fig. 8 is a view similar to Fig. 7 showing a modified relative arrangement of the chamfering and thread-cutting parts.

Fig. 9 is a transverse section on the line 9—9 of Fig. 1.

Fig. 10 is a fragmentary transverse section on the line 10—10 of Fig. 1.

Fig. 11 is a rear elevation of certain parts of the tool at the rear end thereof.

Fig. 12 is a fragmentary axial section of the yieldable latch for holding the work-engaging slide of the die, the latch bolt being shown in the position which is occupies when it is about to release the slide.

Fig. 13 is a section on the line 13—13 of Fig. 12.

Fig. 14 is a sectional view similar to Fig. 12 but showing the latch device in operative position to hold the work-engaging slide in a position corresponding to the retracted position of the thread-forming cutters of the die.

Fig. 15 is a sectional view taken on the line 15—15 of Fig. 14.

Fig. 16 is an axial sectional view of the rear part of a die which is for the most part like that of Fig. 1 but embodies a modified form of latch mechanism.

Fig. 17 is a sectional view of the modified die taken on the same plane as Fig. 16 but showing the parts in their relative positions after disengagement of the latch mechanism and collapse of the cutters.

Fig. 18 is a section on the line 18—18 of Fig. 16 with some of the parts being shown in elevation.

Fig. 19 is a transverse section on the line 19—19 of Figs. 16 and 18.

Figure 20:
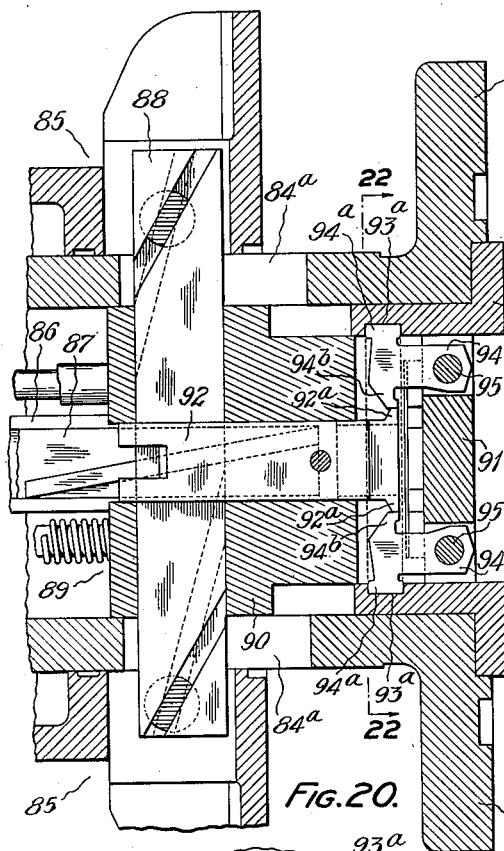
Fig. 20 is an axial sectional view of the rear part of a die which is in general like that of Fig. 1 but which embodies another modified form of latch mechanism.

The improvements constituting the present invention may be embodied in a variety of different forms of thread-cutting apparatus but in the interest of brevity I have, for purposes of explanation and illustration, shown the improvements in the drawings as embodied in a thread-cutting apparatus to which all of the improvements are applicable, namely, a die of the general character disclosed in my United States Letters Patent No. 2,054,028 granted September 8, 1936, and particularly in Figs. 20 to 26, inclusive, of that patent.

Referring in detail to the construction of the apparatus as illustrated in Figs. 1 to 15, inclusive, of the drawings, the tool comprises a tubular, horizontally-disposed body 1 having a rear flanged end 1a adapted to be mounted upon a suitable actuating machine, as for example in the manner illustrated in my prior Patent No. 2,054,028. A flanged sleeve 2 is secured by screws 3 in the rear end of body 1 (Fig. 5) and an annular cutter head 4 is secured by screws 5 to the front end of said body (Fig. 1). The head 4 is formed with a series of radial slots in each of which is slidably mounted a cutter carrier 6, the carrier being secured against forward displacement by a tongue 6a formed thereon to engage a corresponding groove in head 4 (Figs. 1 and 2). At its inner end each carrier is adapted to hold a thread-forming cutter or chaser 7 which is secured in any suitable manner, as by wedge blocks 8, 8.

In the operation of the tool the cutter carriers are gradually retracted outward away from the work to cut the thread in taper form, and at the end of the cutting operation proper the cutters are further rapidly retracted from engagement with the work. Reference will now be made to the means for effecting these gradual and rapid movements of the cutters.

On the cylindrical outer surface of the tubular body 1 is mounted a slide structure designated as an entirety by the numeral 9 (Fig. 1). This slide structure comprises a front section 10, a rear section 11 and a ring 12 for adjustably connecting the sections 10 and 11. The ring 12 is formed at its front side with an outturned flange 12a which cooperates with a flanged ring 13 secured by screws 14 to the section 10 to provide a swiveling connection between ring 12 and section 10; and ring 12 is formed with internal threads which engage external threads on the rear section 11 of the slide structure. By turning the ring 12 the front section 10 of the slide structure can be adjusted forward or backward relative to the rear section 11. The slide structure 9 further comprises a ring 15 which is secured by a series of machine screws 16 to the front end of slide section 10. On its inner surface the ring 15 is formed with a circumferential series of shallow slots in which a corresponding series of cam blocks 17 are secured by screws 18 and 16a, one such block being disposed in alignment with each of the cutter carriers 6. Each block 17 is formed on its inner side with a forwardly and outwardly flaring cam surface 17a and on one side with a cam groove 17b which extends parallel to the cam surface 17a. The adjacent cutter carrier is formed with a cam surface 6b to fit the cam surface 17a of the cam block and with a tongue 6c to fit the groove 17b of said cam block. With the cam connections thus formed between the slide structure 9 and the series of slidably mounted cutter carriers, the latter can be moved inward and outward by forward and rearward movement, respectively, of the slide 9 on the tool body 1.

To effect suitable relative movement of the slide 9 and the tool body 1 the following means are provided. Within the tubular body 1 is mounted a slide designated in its entirety by 19. This inner slide comprises a piston-like cylindrical part 20 which slidably engages the inner surface of the body 1, being held against rotation in body 1 by a key 1c (Fig. 5). With the part 20 is integrally formed a rearward extension 21 which is channel shaped in cross section, as appears in Fig. 9. Slidably mounted in the channel recess of extension 21 is a cam bar 22 having a diagonally extending cam tongue 22a (Figs. 1, 5, 9). The cam bar 22 has an upturned front end 22b which is slotted to receive the double flanged head of an adjusting screw 23 which is threaded in an axial opening of the section 20 of the inner slide. The interlocking connection between the flanged head of screw 23 and the slotted end 22b of the cam bar 22 permits adjustment of the cam bar by rotation of the screw 23, the front end of said screw being formed with an angular socket to receive an adjusting wrench for this purpose. A pin 24 secures the head of screw 23 from lateral displacement in relation to cam bar 22 and the screw is yieldingly held in adjusted relation to cam bar 22 by a spring-pressed detent 25.

A forward axial extension 26 cylindrical in form and flanged at its rear end is detachably secured to the front side of the section 20 of the slide by means of screws 27, 27 (Fig. 5). Mounted on the front end of the extension 26 is a chamfering cutter 28 which is secured to the said extension by bolt 29 extending through cutter 28 and having threaded connection with extension 26. The front end of extension 26 is provided with a diametral tongue 26a and cutter 28 is centrally recessed to fit the cylindrical end and transverse tongue 26a of extension 26 so that the cutter 28 is firmly supported and secured against rotation relative to the slide.

The cutter 28 is made with a series of radial teeth 28a which are grooved in their front sides to provide a series of internal cutting edges 28b, external cutting edges 28c and intermediate non-cutting surfaces or abutments 28d, the edges 28b and 28c serving to chamfer the inner and outer sides, respectively, of the pipe W to be threaded.

The bolt 29 is formed with a forward trunnion extension 29a upon which is rotatably mounted a pipe stopper which is designated in its entirety by the numeral 30 and which comprises a flanged hub 31 to which a pair of annular packing members 32, 32 are secured by screws 33, the packing members 32 being made of leather or other flexible material that will conform to and snugly engage the inner surface of the pipe so as to prevent the flow of cutting oil into the pipe. The stopper 30 is secured on the trunnion 29a by a nut 34.

It will be seen that advance of the tool body 1 relative to the pipe W must result in rearward movement of the slide 19 relative to the tool body. This relative movement is transmitted to the outer slide structure 9 by suitable connecting devices. These connecting devices may take any one of several forms of devices or mechanisms for the transmission of movement from one body to another but in the construction illustrated I have used cam devices for the purpose. Slidably mounted within the tubular tool body 1 is a cylindrical block 35 which constitutes a working abutment or carrier for a transversely disposed cam bar 36 which is rectangular in cross section (Fig. 5) and which slidably fits a correspondingly shaped passage extending transversely through the carrier block 35. The respective ends of the cam bar 36 project from the carrier 35 through slots 1b, 1b in the tool body 1. The top and bottom sides of the slots 1b slidably fit the top and bottom sides of bar 36 and said slots are long enough axially of the tool body to permit some lateral movement of bar 36 parallel to the axis of the tool. On its under side the cam bar 36 is formed with a slot 36a to fit and slidably engage the tongue 22a of the slide bar 22 (see Fig. 9). During the thread-forming operation of the tool the cam carrier 35 is held against rearward movement in the tool body 1 by means which will later be described. Consequently when the inner slide 19 is moved in an axial direction in the tool body 1 the cam connection between the slide and the cam bar 36 effects endwise movement of said bar in one direction or the other according to the direction in which the inner slide moves in relation to the tool body.

Near its two ends the cam bar 36 is formed, on one side with cam slots 36b, 36b and, on its other side, with cam slots 36c, 36c, the inclination of the latter slots to the longitudinal axis of the bar being less than the inclination of the slots 36b. As shown in Figs. 1 and 9, the rear section 11 of the outer slide 9 is provided with heavy bosses 11a, 11a which are formed with passages 11b, 11b, the upper and lower walls of which slidably engage the upper and lower sides of the cam bar 36 while the horizontal transverse dimensions of said passages are considerably greater than the width of the cam bar 36 (see Fig. 1). In each of the bosses 11a is detachably mounted a cylindrical cam member 37 which has its inner end formed with a cam tongue 37a which slidably engages one of the cam grooves 36b of the bar 36. The cylindrical cam members 37 are detachably secured in position by screws 38 which engage circumferential grooves 37b formed in the members 37. In this manner a cam connection is effected between the cam bar 36 and the slide 9 so that longitudinal movement of the bar 36 effected, as previously described by movement of the slide 19 in the tool body 1, causes or controls movement of the slide 9 lengthwise of the said tool body. Rotation of the slide member 11 on tool body 1 is prevented by cam bar 36.

The bosses 11a are formed with a lower set of alternately usable apertures to receive the cylindrical cam members 37 and with a duplicate double set of securing screws 38a, 38a, and by transferring the cam members 37 to the lower apertures the cam tongues 37a are caused to engage the bottom cam grooves 36c of the cam bar 36. With this latter arrangement a given longitudinal movement of the cam bar 36 causes a smaller movement of the outer slide 9 than is effected by the same movement of the bar 36 when the cam grooves 36b are in use.

The cylindrical construction of the cam members 37 and the manner of securing them in operative position permit them to turn freely in the bosses 11a so that their cam tongues 37a are adapted to fit cam grooves of the bar 36 of any angularity and binding between the two cam members is avoided.

From the foregoing description it will be seen that when the non-cutting surfaces 28d of the chamfer cutter 28 engage the work to be threaded and the tool body 1 is fed forward in relation to the work, rearward movement of the slide 19 in the tool body 1 must occur with a resultant lengthwise movement of the cam bar 36 in a direction to effect a rearward movement of the outer slide structure 9 on the tool body 1, which latter movement in turn effects an outward retraction of the thread-cutting chasers. By suitably designing the cam connections between the slide 19 and the cam bar 36 and between the said bar and the outer slide 9 and between the latter slide and the cutter carriers any desired rate of retraction of the cutters or chasers can be provided corresponding to the taper of the threads to be formed. The provision of the alternatively usable cam grooves 36b and 36c makes possible the cutting of threads with two different tapers, and by substituting in the tool in lieu of cam bar 36 other bars having cam grooves of still other angularities to cooperate with the cylindrical cam members 37 the tool can be used to cut threads of still other tapers.

To facilitate the cutter-retracting movement of the outer slide 9 I provide the tool with a circumferential series of coil springs 39 which are interposed between the cutter head of the tool body and the outer slide section 10, each such spring being supported on a stud 40 which is threaded into member 10 (see Fig. 1).

The cylindrical part 20 of the inner slide structure carries two rearwardly extending rods 41, 41 which are disposed diametrically opposite each other (Fig. 9). These rods extend through apertures in the carrier 35 and each rod is surrounded by a long coil spring 42 which also extends through the aperture in the carrier 35 and which abuts at its front end against the slide part 20 and at its rear end against a cylindrical block 43 which is secured by bolts 44 to the rear face of cylindrical extension 35a of carrier 35, said block 43 and extension 35a being designed to slidably fit within the sleeve 2. The block 43 is formed with apertures 43a, 43a concentric with rods 41 so that said rods can move rearward freely in relation to block 43. As the inner slide 19 moves rearward in the tool body during the thread-cutting operation the springs 42 exert a rearward pressure upon block 43 and hence upon carrier 35, but movement of the latter during the thread-cutting operation is prevented by latch mechanism which will presently be described.

The cylindrical slide member 20 also carries two diametrically opposite rearwardly-extending rods or bolts 45, 45 each of which fits within a sleeve-like piston 46 which is slidably mounted in passages 35b in the carrier 35 (Figs. 1 and 9). Cylindrical block 43 also is formed with apertures 43b, 43b through which bolts 45 may extend. The front ends of bolts 45 are formed with wrench sockets so the bolts can be adjusted in slide part 20 after the tool is fully assembled and a suitable dash pot and stop action secured in connection with the mutual separating movement of parts 20 and 35 under the expansive pressure of springs 42.

As previously noted, the cam abutment or carrier 35 is designed to be held in fixed position in the tool body while the cutters are engaging the work. However, said carrier is also designed to have a sudden rapid rearward movement at the end of the thread-cutting operation and, by the resulting lateral movement of the cam bar 36 parallel to the axis of the tool, to effect a rapid rearward movement of the outer slide 9 and a corresponding rapid retraction of the cutters from engagement with the work. In other words, carrier 35 serves by its movement to effect the rapid collapse of the cutters. Reference will now be made to the novel holding means in the form of latch mechanism which while engaged prevents rearward movement of carrier 35 and when disengaged permits the sudden rearward movement of the carrier referred to above.

The said latch mechanism comprises a pair of latches 47, 47 which are pivotally mounted on pins 48, 48 carried by block 43, the extension 35 and block 43 being slotted as shown in Figs. 1 and 11 to accommodate said latches. Each latch is formed at its front end with an outer latch extension 47a designed to operatively engage the front face or shoulder of sleeve 2, and with an inward cam extension 47b. As already stated, the pressure of springs 42 during the thread-cutting operation is exerted upon block 43 and the connected carrier 35, tending to move said block and carrier rearward. The rearward force exerted on said block and carrier is transmitted through pivot pins 48 to latches 47 and the reaction of sleeve 2 on the latches tends to swing them inward around pivot pins 48 and out of engagement with the sleeve 2. Such disengagement is prevented by cam block 49 which is slidably mounted in carrier 35 and has its depressed rear end (Fig. 5) formed at each side with a cam lug 49a designed to engage the cam extension 47b of the adjacent latch 47 and prevent the latter from swinging inward out of engagement with sleeve 2. For a reason which will later appear, the cam lugs 49a have their front sides 49' inclined as shown in Fig. 1.

Cam block 49 is normally pressed forward to the latch-locking position shown in Figs. 1 and 5 by a coil spring 50 which has one end engaging block 43 and surrounds a guide pin 51 slidably mounted in block 43 and through the head of pin 51 exerts a forward pressure on an upstanding pin 49b carried by the block 49 (Fig. 5). However, the front end of the cam block 49 is disposed so as to be engaged by the upstanding end 22b of the cam bar 22 near the end of the rearward movement of the latter during the thread-cutting operation and the resulting rearward movement of the cam block 49 causes disengagement of cam lugs 49a from the cam extensions 47b of the latches 47 so that the latter are permitted to swing inward out of engagement with the front end of sleeve 2, as indicated in Fig. 3 where the parts are in the positions occupied when disengagement is just about to occur. This disengagement of the latches permits the previously mentioned rapid rearward movement of the carrier 35 in the tool body which effects the rapid retraction of the cutters.

It will be observed that the pivotal axis of each of the latches 47 is well to the rear of the latch extensions 47a, 47b so that the forward or backward component of the movement of extension 47a is relatively small for a given angular movement of the latch. The significance of this will later appear.

In the upper side of cam carrier 35 is mounted a manually operable cam 52 which has its cam surface engaging a cam surface 49c on the cam block 49, and by depressing the cam 52 the block 49 can at will be moved rearward against the pressure of spring 50 so as to permit disengagement of latches 47 at any time during the thread-cutting operation. The cam 52 is normally retracted by a coil spring 53 and in its retracted position the cam limits forward movement of the cam block 49 by spring 50.

The tool is constructed so that when it is advanced toward the work and the work is engaged by the chamfering cutter 28, the inner slide 19 is held against rearward movement in the tool body 1 until the chamfering operation is completed. To secure this result the carrier 35 is fitted with a latch device designated in its entirety by the numeral 54 to engage and resist the movement of the slide extension 21. This latch device comprises a sliding bolt 55 which is mounted in a sleeve 56 screwed into carrier 35, as shown in Fig. 5. The bolt 55 is surrounded by a coil spring 57 the inner end of which engages a shoulder on bolt 55 and the outer end of which engages an adjustable sleeve 58 which is threaded into the outer end of sleeve 56 and can be adjusted to vary the tension of spring 57. The inner end of latch bolt 55 is formed on one side with an inclined cam surface 55a which is arranged to engage a correspondingly inclined surface 21a formed on slide extension 21, as shown in Figs. 5 and 12. By suitable adjustment of the tension of spring 57 the resistance of the latch bolt 55 to rearward movement of slide 19 can be made great enough to prevent rearward movement of slide 19 while the cutting edges 28b and 28c of the chamfering cutter are effecting the chamfering operation on the pipe W, but not great enough to resist the rearward reaction of pipe W on cutter 28 when the extreme end surface of the pipe engages the non-cutting surfaces 28d of the chamfer cutter. When this latter engagement occurs the latch bolt 55 is forced outward against the tension of spring 57, as indicated in Fig. 12, so as to release slide 19 for rearward movement. Thereupon as the forward feed of the tool body in relation to the work proceeds the relative rearward movement of slide 19 in tool body 1 is transmitted to the outer slide to effect retraction of the thread cutters 7.

The latch bolt 55 performs the additional function of securing the slide 19 in cutter-retracted position when that is desired. To this end the under side of the slide extension 21 is formed with a series of notches 21b, 21b to be engaged by the inner end of bolt 55 so as to prevent forward movement of slide 19 under the impulse of springs 42, it being desirable to hold the slide retracted in this way with the thread cutters and their carriers correspondingly retracted outward when it is desirable to inspect, adjust or change the cutters. To prevent the latch bolt 55 entering notches 21b during normal operation of the tool, said bolt has its inner end made wide enough on one diameter so that it cannot enter the relatively narrow notches 21b, 21b (see Fig. 13), while by rotating bolt 55 through 90 degrees it is permitted to enter the notches 21b, as indicated in Fig. 15. To facilitate the rotational adjustment of bolt 55, it is provided at its outer end with a suitable knurled handle 55b and has its inner end grooved at 55c to cooperate with the end of a yieldable detent bolt 59 which is yieldingly pressed against latch bolt 55 by coil spring 60. As shown in Fig. 5, the tool body 1 is suitably slotted or apertured to accommodate the latch device 54 and the same is true with respect to the cam 52.

Figure 22:
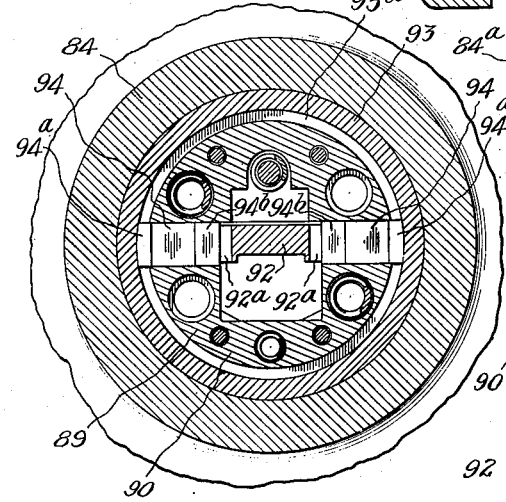
Fig. 22 is a section on the line 22—22 of Fig. 20.

The tool is provided with means for conducting cutting oil to the cutters of the character described in my said Patent No. 2,054,028 and shown in Fig. 22 of the drawings thereof. The said means comprise a circumferential series of longitudinal passages 61 in the wall of tool body 1 which may be made to communicate in any known fashion with a source of oil supply and which discharge the oil through outlets 62 adjacent the cutters.

The outer slide structure 9 of the tool may be moved forward on the tool body 1 at the end of a thread-forming operation in any suitable known manner to reset the tool with the carrier latched in its forward position. I have not shown actuating devices for this purpose as they constitute no part of the present invention. Reference may be made to my said Patent No. 2,054,028 in which two different forms of such actuating devices are disclosed.

In the operation of the tool it is first adjusted in accordance with the diameter, taper and length of the threads to be formed. Assuming that the work to be threaded is a section of pipe, with the outer slide structure 9 and the inner slide 19 moved forward with respect to the tool body and with the cam carrier 35 latched in its forward position, as shown in Fig. 1, the first of the three adjustments referred to is effected by turning the ring 12 to adjust the front section of the outer slide forward or backward as the case may be so that the cutters when in their innermost position will be suitably disposed to start the cut to produce the threads of desired diameter and of a predetermined length, bearing in mind that the diameter at the large end of the taper is the nominal diameter of the thread. The adjustment of the tool for the taper of the threads is effected by placing the cylindrical cam members 37 in engagement with the top cam groove 36b or in the bottom cam groove 36c of the cam bar 36; or, if a still different taper is desired, a different cam bar having cam grooves of still different inclination may be substituted in the tool, as previously explained. Finally, adjustment for the length of the thread to be formed is effected by adjustment of the screw 23 to move the cam member 22 forward or backward in relation to the cam carrier 35 and the cam block 49 carried thereby. To effect this latter adjustment the chamfer cutter 28 and pipe stopper 30 are removed from the slide extension 26 so that a wrench may be inserted in the latter to engage the screw 23.

The tool having been adjusted and the pipe W to be threaded having been secured in the work holder of the machine, the latter is actuated, first to advance the stopper device into the end of the pipe (and this may be done with a relatively rapid feed) and then to produce a relative rotational and axial movement of the work and the tool. The first effect of this latter movement is to cause the cutting edges of the chamfering cutter 28 to engage the end of the pipe and chamfer the inner and outer pipe surfaces adjacent the end of the pipe. During this chamfering cut the yieldable latch device 54 affords sufficient resistance to prevent movement of the inner slide 19 in the tool body 1, but when the chamfering cut has been completed and the extreme end of the pipe W engages the non-cutting surfaces 28d of the chamfering cutter the resistance of the latch device 54 is overcome and further forward axial movement of the tool body 1 in relation to the work causes a correspondingly rearward movement of the slide 19 in the tool body.

As the inner slide 19 moves rearward in tool body 1 the cam member 22 of the slide causes lengthwise movement of cam bar 36 which in turn causes a rearward movement of the outer slide 9 on the tool body at a rate corresponding to the taper of the thread to be cut. The rearward movement of slide structure 9 effects gradual retraction of the thread cutters 7 as previously explained.

As the thread-cutting operation nears completion the part 22b of the cam member 22 engages the front end of cam block 49 and by forcing the latter rearward disengages the latches 47, 47, whereupon the springs 42, which have been compressed by the rearward movement of slide 19, cause the rapid rearward movement of the cam carrier 35 and the resultant rapid rearward movement of the cam bar 36 effects a corresponding movement of the outer slide structure 9 with a resultant rapid retraction of the thread cutters out of engagement with the work. When the latches 47 are disengaged from the front end of sleeve 2 and the carrier 35 is moved rearward as described the latches 47 are carried rearward so that their front ends lie within the sleeve 2 with the cam extensions 47b of the latches disposed in front of the cam lugs 49a of the cam block 49 (Fig. 4).

The machine upon which the tool is mounted is then reversed to withdraw the tool from the work and thereafter the tool can be reset for repetition of the operation. When the tool is withdrawn from the work the springs 42 are permitted to expand and move the slide 19 forward in the tool body. This carries the upstanding end 22b of cam bar 22 forward out of engagement with the cam block 49 and the spring 50 then tends to move the block 49 forward in the carrier 35. However, this movement of block 49 cannot occur until carrier 35 has been moved forward to the position shown in Fig. 1 by the resetting of the tool. This is due to the fact that the latches 47 when in their retracted positions within the sleeve 2 hold their cam extensions 47b in front of cam lugs 49a of the block 49 so the latter cannot be moved forward by spring 50. In the resetting of the tool the outer slide structure 9 is moved forward on the tool body carrying with it cam bar 36 and the carrier or abutment 35 and as soon as this movement brings the front ends of latches 47 out of the bore of sleeve 2 the inclined front faces of cam lugs 49a are effective, under the forward pressure of spring 50 on block 49, to swing the latches 47 outward into their engaging positions shown in Fig. 1.

Shock caused by the rapid rearward movement of carrier 35 in the tool body is prevented by air cushion dash-pot action between the carrier and the sleeve 2. Similarly shock incident to the relative movement of the slide 19 and cam carrier 35 away from each other under the expansive force of springs 42 following the threading operation is prevented by air cushion dash-pot action between the pistons 46 and the carrier 35. These cushioning actions are explained in detail in my said Patent No. 2,054,028.

During the threading operation cutting oil or other liquid is sprayed upon the cutters but no considerable amount of this oil is allowed to run into the end of the pipe and flow along in the pipe with resultant waste when the pipe is removed from the machine following the thread-cutting operation. Such small amount of oil as enters the end of the pipe adjacent the stopper device 30 is pushed out by the stopper device, when the latter is withdrawn from the pipe, and finds its way into the oil sump of the machine and is reused. The arrangement of the stopper device in advance of the pipe-engaging part of the inner slide of the tool insures the entrance of the stopper into the pipe before the latter comes adjacent the oil delivery nozzles of the tool and thus prevents entry of oil into the pipe before entry of the stopper into the pipe at the beginning of the thread-cutting operation and after movement of the stopper out of the pipe at the end of such operation. Thus a large wastage of oil which would otherwise occur is prevented by a relatively simple device, the operation of which is automatic in the operation of the tool.

The manner in which adjustment is effected in my improved tool in order to vary the length of the thread cut constitutes a distinct improvement over the prior practice with which I am familiar. By causing this adjustment to automatically or simultaneously adjust the thread cutters inward or outward, as the case may be, the travel of the tool body relative to the inner or work-engaging slide during the thread-cutting operation need be no greater than is necessary to form the thread of the desired length. Where relatively short threads are being cut this effects a very substantial saving in time in comparison with the prior practices. For example, in my said Patent No. 2,054,028 the variation in the length of the thread cut is effected by adjustment of the work-engaging member on the front end of the inner slide. Thus in order to cut a short thread the work-engaging member is adjusted forward on the slide so that the tool body makes a considerable forward travel relative to the inner slide and the work before the thread-forming cutters engage the work. In other words, the travel of the tool is always the same regardless of the length of the thread cut and the shortening of the thread cut is secured by postponing the engagement of the cutters with the work, this being necessary with the construction shown in my said patent in order to prevent variation in the length of the thread from causing variation in the maximum or nominal diameter of the thread cut. By my present invention I secure variation in the length of the thread without affecting the nominal diameter of the thread and realize a minimum travel of the tool with a corresponding saving in time.

The way in which the present tool effects the chamfering of the work also marks an improvement over prior practice known to me. By use of the cam latch 54 to oppose the rearward movement of the inner slide in the tool body during the chamfering cut this result is secured with a mechanism that is relatively simple in construction, reliable in operation and inexpensive. With the slope of the cam surfaces 21a and 55a of the latch parts suitably determined a relatively light coil spring 57 is adequate to prevent rearward movement of the inner slide in the tool body during the chamfering cut and a simple adjustment of the spring 57 is all that is necessary to insure an easy release of the slide when the non-cutting surfaces 28d of the chamfering tool engage the end of the work. Thus the completion of the chamfering of the work may be definitely completed before the thread-forming cutters come into action, as indicated in Figs. 5 and 7. This better insures the cutting of threads true to form on the chamfered part of the pipe. In some instances, however, it may be desirable to bring the thread-forming cutters into contact with the work before the chamfering cut is entirely completed. In this event the forward extension 26 of the inner slide structure can be removed and an interchangeable extension member substituted that is similar in every respect except as to length. Thus, by substituting a shorter member 26 for that shown in Fig. 5 there can be secured, at the end of the chamfering cut, a relative positioning of the chamfering and thread-forming cutters such as is shown in Fig. 8.

Not only does the simple latch mechanism 54 perform the above stated functions in connection with the chamfering of the work but in addition it serves, in the manner previously described, the further purpose of locking the inner slide in any one of several retracted positions in the tool body when it is desirable to adjust, clean or renew the thread-forming cutters.

From the foregoing description it will be apparent that the improved means for varying the length of the thread cut is not only advantageous in that it minimizes the tool travel regardless of the length of the thread but also because it makes possible the use of the relatively simple cam latch device 54 in connection with the chamfering operation; for, since the main parts 20 and 21 of the inner slide always start the cutting operation in the same position in relation to the tool body and the cam abutment 35, it is possible to have a definitely fixed cam surface on the slide part 21 to cooperate with the definitely located latch mechanism 54.

It will be observed that the cam block 49 is not actuated to effect release of the latches and the sudden retraction of the threading cutters until near the end of the thread-cutting operation. Thus any wear that may occur in the latch mechanism is limited in its effect upon the form of the thread cut to a very small portion of the thread at one end thereof. Furthermore, in my improved latch mechanism the effect of the wear even upon this small portion of the thread is rendered very small by the peculiar construction, arrangement and operation of the latch parts. Thus any wear between the latch extension 47a and the front face or shoulder of sleeve 2 will be very slight because no relative movement of these parts occurs until cam lugs 49a are disengaged from the latch extensions 47b and upon such disengagement the pressure between sleeve 2 and extensions 47a of the latches is reduced to an amount substantially less than the entire static pressure or force exerted by the actuating springs 42 so that any wear of the mutually engaging parts of the sleeve 2 and latches 47 during their disengagement is correspondingly small. Also, because of this unloading action, the latch is very easy acting and operates smoothly. Such slight wear of the latch mechanism as occurs is chiefly of the parts 49a and 47b. However, any inward angular movement of the latch 47, prior to complete disengagement of the latches, due to this latter wear is not only slight in amount but has an even smaller effect in the way of permitting rearward movement of carrier 35 because the pivot pin 48 of the latch is well to the rear of the point of engagement between latch extension 47a and sleeve 2 so that the inward angular movement of the latch permitted by the wear between parts 49a and 47b has a very small rearward component to be transmitted to the cam bar 36 and affect the form of the thread. Thus, it will be seen, the effect of any possible wear of the latch mechanism upon the form of the thread cut is practically negligible and, furthermore, this result is secured with a latch mechanism that is easy acting (because of the unloading action above referred to), is relatively simple and rugged in construction and is positively and reliably disengaged by the movement of the inner slide relative to the tool body.

My improvements can be embodied in various forms of tool construction. For example, some features of the invention applicable to taps, as well as dies, also various parts of the mechanism described above, can take various other specific forms. Thus, while the movable latch member of the holding means for abutment or carrier 35 is preferably pivotally mounted, it may be constructed and mounted for other forms of movement, or other pivotal forms of latch device can be used. The description which follows will serve to illustrate some of the various modified forms of construction that can be used in carrying out the invention, but it is to be understood that various other forms of construction are within the invention as defined by the claims at the end of the specification.

In Figs. 16 to 19, inclusive, is shown a modified form of latch or holding mechanism for the cam bar carrier. In this construction the tool body 63, the outer slide structure designated as an entirety by 64, the inner slide structure of which only the rear channel shaped extension 65 and adjustable cam bar 66 are shown, and the transverse cam bar 67 which operatively connects the inner and outer slides, are all substantially identical with the corresponding parts of the tool already described. The transverse cam bar 67 is slidably mounted in slots 63a of the tool body and also is slidably mounted in a carrier designated as an entirety by 68 and comprising a main cylindrical part 69 and a rear plate portion 70 secured to part 69, the carrier being slidably mounted in the tool body and functioning generally, in cooperation with other parts of the tool not here described, in substantially the same manner as the carrier 35 of the first described construction. Also slidably mounted in carrier part 69 is a cam block 71 similar to the corresponding part of the first described tool, said cam block having its rear end depressed and formed with oppositely extending cam lugs 71a, 71a each of which is arranged to cooperate with a latch device. 72 is a flanged sleeve or ring secured to the rear end of tool body 63.

Each of the above mentioned latch devices, designated as entirety by the numeral 73, in the present construction is in the form of a toggle linkage comprising slotted or forked link 74 pivoted by pin 75 on carrier block 69, solid link 76 secured by pivot pin 77 to sleeve 72 and pivot pin 78 which serves to connect the two links. Link 76 is provided with a cam extension 76a designed to cooperate with the adjacent cam extension 71a of cam block 71. Stop pin 79 mounted in carrier block 69 serves to positively limit the outward swinging movement of the toggle linkage and a bow-shape flat spring 80 secured at one end by screw 81 to link 76 serves by engagement intermediate its ends with the inner wall of tool body 63 both to yieldingly press the middle joint of the linkage inward and to cushion its outward movement.

Since in the present construction the carrier block 69 and sleeve 72 are slotted as shown to receive the toggle links it is not feasible to secure an air cushion dash-pot action between parts 69 and 72. In lieu of this I provide sleeve 72 with a circumferential series of pins or plungers 82 which telescopically engage cylindrical chambers 83 drilled in carrier block 69, each of these chambers being provided at its front end with a small bleed passage 83a. This construction provides a series of dash pots so that rapid rearward movement of the carrier structure 68 is cushioned by the air in chambers 83 as the air can escape only slowly through bleed passages 83a.

The operation of the tool with the last described latch mechanism will readily be understood in the light of the operation of the first described tool. Fig. 16 shows the parts in the position occupied during the thread-cutting operation and it will be observed that with the toggle linkage held in practically fully extended position by lugs 71a of cam block 71, the carrier 68 is prevented from moving rearward and serves as an effective abutment for cam bar 67. As the thread-cutting operation nears its end, the front upstanding end (not shown) of cam bar 66 engages the front end of the spring-pressed cam block 71 and by moving it rearward allows the cam extensions 76a of toggle links 76 to pass over the front edges or corners of cam lugs 71a so that the toggle latches are permitted to collapse inward and thus permit rearward movement of carrier 68 under spring pressure as explained in connection with the first described tool. Fig. 17 shows the toggles collapsed and the carrier in its rearmost position.

During the rapid rearward movement of carrier 68 dash pot parts 82 and 83 are telescoped together and the air between them, which can escape only slowly through the bleed passages 83a, cushions the movement. In addition, as will be seen from an inspection of Fig. 17, the flat springs 80 of the toggle latches by engagement with links 74 serve to cushion the collapsing movement of the links.

The toggle latch mechanism shown in Figs. 16 to 19, inclusive, differs functionally from the latch mechanism of the first described construction in that the former positively holds the abutment 68 against both rearward and forward movement in the tool body. Strictly speaking the clearance between links 74 and stop pins 79 during the thread-cutting operation (Fig. 16) will permit a corresponding outward movement of links 74 and forward movement of abutment 69 but the clearance between links 74 and pins 79 is so small that such movement of the abutment is negligible. Because of the positive action of the toggle latch in both directions, the retraction of the cutters during the thread-cutting operation is positive, whereas in the case of the latch construction of the tool shown in Fig. 1 the retraction of the cutters is dependent upon the force of the springs 42 interposed between the inner slide 19 and the abutment 35. For example, if the cutters or cutter-actuating parts of the tool should stick or bind sufficiently because of dirt or foreign material between working surfaces of the tool, there is nothing but the force of the springs to prevent the latch members 47 on abutment 35 from moving forward away from sleeve 2, thus interfering with the uniform retraction of the cutters as the tool body advances in relation to the work. The positive type and the non-positive type of latch each has its advantages. For example, when good working conditions can be maintained the spring pressure is sufficient to hold the cam abutment 35 in latched position and insure the desired gradual retraction of the cutters and yet if the tool under exceptional conditions should jam, the springs will yield and prevent breakage. On the other hand, if the power feed of the tool embodies a safety device the positive type of latch may be desirable to overcome at least moderate abnormal resistances due to unfavorable working conditions, the safety device of the feed being relied upon to prevent breakage.

With the toggle type of latch of the tool last described, there is practically a negligible amount of wear of the latch parts that might affect the form of even the final part of the thread cut by the tool. With the toggle linkages expanded as shown in Fig. 16 the middle joint of the toggle is so close to the line of centers through the end pivots of the toggle that pressure between parts 71a and 76a during the thread-cutting operation is very low indeed and the wear between these two parts during their relative movement is correspondingly slight. Furthermore, as soon as cam lug 71a is disengaged from the extension 76a of the toggle link pressure upon the toggle pivot bearings is reduced to a very low value and inasmuch as there is no movement in these bearings before disengagement of parts 71a and 76a and since the bearing surfaces can be made large in area and are always in full engagement, the wear in the toggle joints or bearings also is negligible.

A second modified form of latch or holding mechanism for the cam bar carrier or abutment is shown in Figs. 20 to 23, inclusive, of the drawings, this second modification also being adapted to positively resist movement both forward and backward. In this last construction the tool body 84, the outer slide structure designated as an entirety by 85, the inner slide structure, of which only the rear channel-shaped extension 86 and adjustable cam bar 87 are shown, and the transverse cam bar 88 which operatively connects the inner and outer slides, are all substantially identical with the corresponding parts of the tool already descrbed except that the rear part of the tool body 84 is lengthened somewhat. The transverse cam bar 88 is slidably mounted in slots 84a of the tool body and also is slidably mounted in a carrier designated as an entirety by 89 and comprising a main cylindrical part 90 and a rear plate portion 91 secured to part 90, the carrier being slidably mounted in the tool body and functioning generally, in cooperation with other parts of the tool not here described, in substantially the same way as the carrier 35 of the first described construction. There is also slidably mounted in carrier part 90 a cam block 92 similar to the corresponding part of the first described tool, said cam block having its rear end depressed and formed with oppositely extending cam lugs 92a, 92a each of which is arranged to cooperate with a latch device. 93 is a flange sleeve secured to the rear end of the tool body 84 and formed interiorly near its front end with a latch groove 93a.

A pair of pivoted latches 94 is mounted on pins 95 carried by the abutment member 91, the abutment parts 90 and 91 being slotted to accommodate said latches. Each latch is formed at its front end with an outer latch extension 94a formed to nicely fit between the parallel side walls of the latch groove 93a, the front and rear surfaces of the extensions 94a being rounded to permit angular movement of the extension in the groove without binding and without change of clearance. Each latch is also formed with an inward cam extension 94b arranged to cooperate with one of the cam lugs 92a.

As in the case of the first described construction, the pressure of the springs interposed between the inner slide and the abutment 89 tends to move the abutment structure rearward during the thread-cutting operation. Also, as in the first form of construction, the rearward force exerted on the carrier is transmitted to the latches 94 and the reaction of the sleeve 93 on the latches tends to swing them inward around the pivot pins 95 and out of engagement with the sleeve 93, but such disengagement is prevented by engagement of the cam extensions 94b with the cam lugs 92a until the latter are moved rearward by the rearward movement of the cam block 92 toward the end of the thread-cutting operation. Furthermore, as long as the latch extension 94a engages the groove 93a of sleeve 93 the carrier structure 89 is prevented from moving forward by the engagement of the latch with the front wall of groove 93a.

Figure 21:
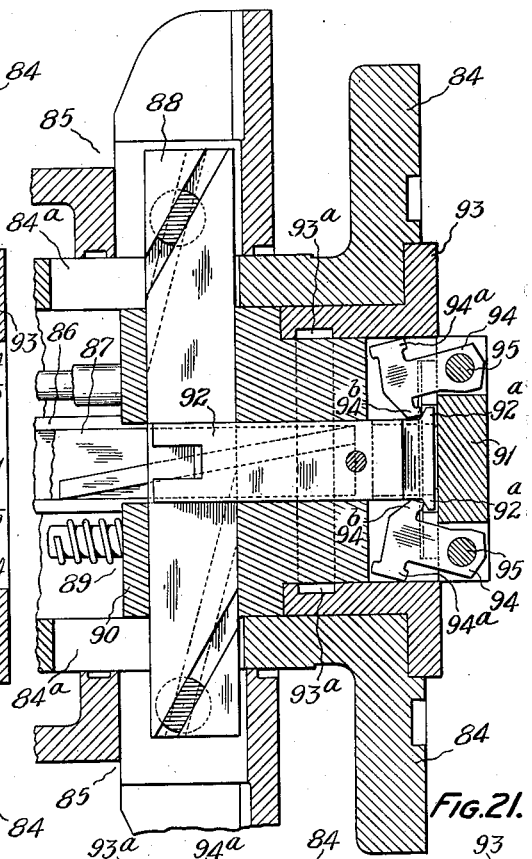
Fig. 21 is a sectional view of the same die similar to Fig. 20 but showing the parts in their relative positions after disengagement of the latch mechanism and collapse of the cutters.
Figure 23:
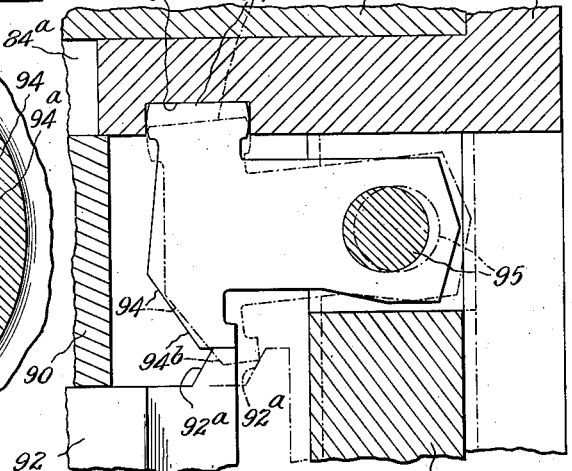
Fig. 23 is an enlarged fragmentary sectional view showing one of the pivoted latches of the die shown in Fig. 20 and indicating by broken lines the movement of the latch when it is being disengaged.

When, in the operation of the tool constructed as last described, the cam block 92 is moved rearward in a manner explained in connection with the tool shown in Fig. 1, the rearward force of the spring pressure on the abutment 89 causes the latches 94 to swing inward as indicated by dotted lines in Fig. 23 until they are disengaged from the latch groove 93a whereupon the spring pressure moves the abutment structure 89 rapidly rearward to the position shown in Fig. 21, carrying with it the cam bar 88 and the outer slide 85 so as to rapidly retract the cutters, such movement of the parts being cushioned by the air trapped between the abutment 89 and the sleeve 93.

It will be understood that a tool having the form of latch mechanism shown in Figs. 20 to 23, except for the fully positive action of the latches, is similar to the operation of the tool shown in Fig. 1 as already described.

In Figs. 24 to 28, inclusive, I have shown modified forms of the parts carried at the front end of the inner slide of the tool of Fig. 1.

Figure 24:
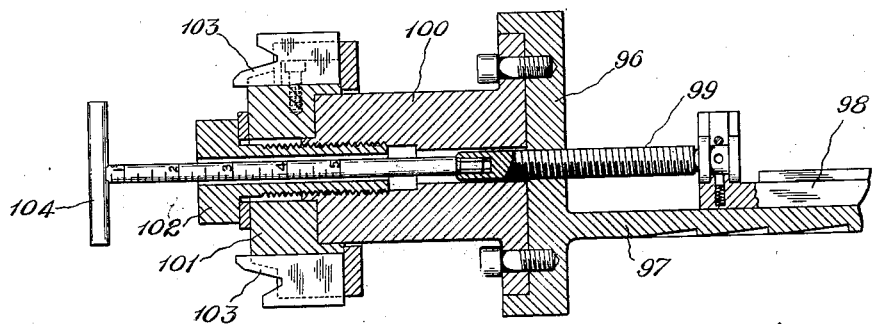
Figs. 24, 25 and 26 are fragmentary axial sectional views showing three modified forms of the work-engaging slide of the tool shown in Figs. 1 and 2.

In Fig. 24 the cylindrical part 96 of the inner slide, the rearward extension 97 thereof, the adjustable cam part 98 and the adjusting screw 99 are similar to the constructions previously described. However, the front extension 100 of the slide is in this case fitted with chamfering devices comprising a cutter carrier 101 which is secured on part 100 by means of a flanged sleeve 102 which is threaded into the part 100 and detachable cutters 103, 103 are secured in well known manner in the carrier 101. This construction omits the use of the oil-saving stopper but permits the use of a wrench or tool 104 for adjusting the screw 99 without removing any of the parts of the apparatus. Furthermore, by furnishing the stem of the wrench 104 with a suitable measuring or indicating scale, as shown, the adjustment of the tool for any particular length of thread can be made very easily and rapidly, the indicating scale being read with reference to the outer end surface of the sleeve 102.

Figure 25:
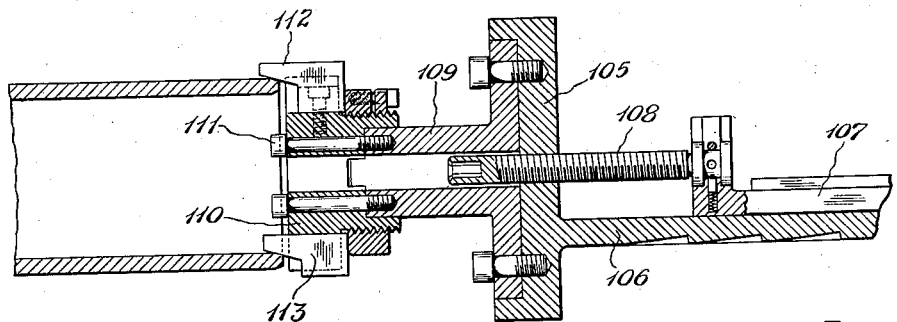

In the construction shown in Fig. 25 the slide parts 105, 106, 107 and 108 are like the parts 96, 97, 98 and 99, respectively, of Fig. 24 and the forward extension part 109 is made to receive a carrier 110 secured by screws 111 and the said carrier 110 supports removable chamfer cutters 112 for chamfering the outer surface of the work and separate removable cutters 113 for chamfering the inner surface of the work. A tool such as that shown at 104 in Fig. 24 can be used with the construction of Fig. 25.

Figure 26:
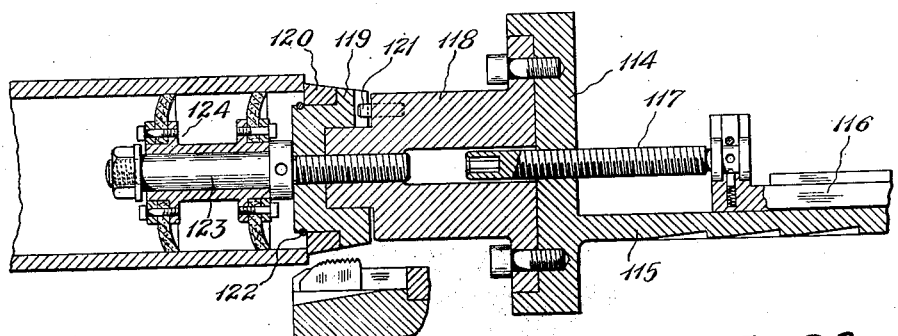

In Fig. 26 the slide parts 114, 115, 116 and 117, also, are like the parts 96, 97, 98 and 99, respectively, of Fig. 24, while the forward extension 118 is adapted to support a carrier 119 on which is rotatably mounted a work-engaging ring 120, the carrier 119 being held against rotation on the extension 118 by a pin 121 and the ring 120 being secured against displacement by a snap ring 122. The carrier 119 is secured on the slide extension 118 by the threaded trunnion 123 of a pipe stopper device 124 similar to that described in connection with Figs. 1 and 3. This form of construction provides no special means for effecting the chamfering of the work.

Figures 27, 28:
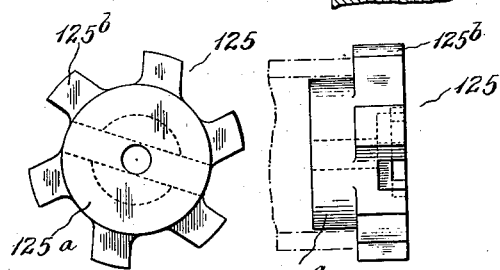
Figs. 27 and 28 are, respectively, a front elevation and side elevation of a form of work-engaging member which can be used in place of the chamfering cutter member of Figs. 1 and 2.

Figs. 27 and 28 show still another form of work-engaging member which may be mounted on the front end of the inner slide of the tool when the latter is not to include the special chamfering means. This work-engaging member 125 is shown of a form adapted to be mounted on the front end of the inner tool slide in the same manner as the chamfering work-engaging cutter 28 shown in Figs. 1 and 2. The member comprises a main body part 125a and outward extensions 125b which are designed to be engaged by the end of the work as indicated by the dotted lines in Fig. 28, the spaces between the extensions 125b being disposed to accommodate the thread-forming cutters as indicated in Figs. 1 and 2. This form of construction affords radially larger contact surfaces for the end of the work than does that shown in Fig. 26.

What I claim is:

1. In apparatus for cutting external taper threads, the combination of an axially chambered tool body; a thread-forming cutter operatively mounted on the tool body to permit receding movement of the cutter transversely of the body; and means operatively supported by the tool body for causing such movement of the cutter when the tool body and the work are given relative rotational and axial movement, said means comprising a structure movably mounted on the body and operatively connected to the cutter, a work-engaging slide mounted for axial movement on the tool body, devices forming an operative connection between the said structure and the said slide and operable by relative axial movement of the tool body and the work gradually to move the said structure to effect gradual retraction of the cutter relative to the work during the thread-forming operation, and mechanism operable at the end of the thread-forming operation rapidly to further retract the cutter, the latter mechanism being adjustable to vary the point in the relative movement of the tool body and the work at which the cutter is rapidly retracted and thereby vary the length of the thread cut and being adapted by its adjustment to simultaneously correspondingly move the cutter-actuating part of the said structure, whereby the nominal diameter of the thread cut by the operation of the apparatus is not affected by variation of the length of the relative movement of the tool body and the work which effects the said variation of the length of the thread cut.

2. In apparatus for cutting external taper threads, the combination of an axially chambered tool body; a thread-forming cutter operatively mounted on the tool body to permit receding movement of the cutter transversely of the body; and means operatively supported by the tool body for causing such movement of the cutter when the tool body and the work are given relative rotational and axial movements, said means comprising a structure movably mounted on the body and operatively connected to the cutter, a work-engaging slide mounted for axial movement on the tool body and comprising a main part which engages the work and movably engages and is supported by the tool body and another part adjustably connected to the main part, devices forming an operative connection between the said structure and the adjustable part of said slide and operable by relative axial movement of the tool body and the work gradually to move the said structure to effect gradual retraction of the cutter relative to the work during the thread-forming operation, and mechanism operable at the end of the thread-forming operation rapidly to further retract the cutter, the latter mechanism comprising an operative abutment for the devices connecting the aforesaid structure and slide which abutment is movably supported by the tool body, a latch for disengageably securing the abutment against movement relative to the tool body and means carried by the adjustable part of the slide for disengaging the latch, adjustment of the adjustable part of the slide serving to vary the length of the thread cut and to correspondingly change the starting position of the cutter.

3. In thread-cutting apparatus of the receding chaser type, the combination of a tool body; a thread-forming cutter operatively mounted on the tool body to permit receding movement of the cutter transversely of the body; means operatively supported by the tool body for causing such movement of the cutter, said means comprising a work-engaging slide mounted for movement longitudinally of the tool body and operative connections between said slide and the cutter to effect the desired receding movement of the cutter during relative movement of the tool body and slide; a chamfering cutter mounted on the front end of the slide to engage and chamfer the work when the tool body and work are given relative rotational and axial movements; and means interposed between the tool body and slide for preventing cutter-retracting movement of the slide relative to the tool body until the chamfering operation on the work is completed by the initial axial advance of the tool body in relation to the work and then automatically releasing the slide for such cutter-retracting movement.

4. In thread-cutting apparatus of the receding chaser type, the combination of a tool body; a thread-forming cutter operatively mounted on the tool body to permit receding movement of the cutter transversely of the body; a slide mounted for movement longitudinally of the tool body; operative connections between said slide and the cutter to effect the desired receding movement of the cutter during relative movement of the tool body and slide; a chamfering cutter mounted on the front end of the slide to engage and chamfer the work when the tool body and work are given relative rotational and axial movements in the thread-cutting operation, said chamfering cutter being formed to provide a non-cutting abutment for the end of the work after the chamfering cut is completed; and means interposed between the tool body and slide for yieldingly resisting cutter-retracting movement of the slide relative to the tool body during the first part of the said relative movements of tool body and work and, upon completion of the chamfering cut, releasing the slide for such cutter-retracting movement.

5. In thread-cutting apparatus of the receding chaser type, the combination of a tool body; a thread-forming cutter operatively mounted on the tool body to permit receding movement of the cutter transversely of the body; a slide mounted for movement longitudinally of the tool body; operative connections between said slide and the cutter to effect the desired receding movement of the cutter during relative movement of the tool body and slide; a yieldable latch carried by the tool body and having a cam engagement with the said slide whereby the latch is moved to inoperative position when a predetermined pressure is developed between the engaging cam surfaces of the latch and slide; a chamfering cutter mounted on the front end of the slide to engage and chamfer the work when the tool body and work are given relative rotational and axial movements in the thread-cutting operation, said chamfering cutter being formed to provide a non-cutting abutment for the end of the work after the chamfering cut is completed, whereby at the end of the chamfering cut sufficient pressure is transmitted from the work to the slide to overcome the resistance of the said latch and permit relative axial movement of the slide and tool body to effect the receding movement of the cutter.

6. In thread-cutting apparatus of the receding chaser type, the combination of a tool body; a thread-forming cutter operatively mounted on the tool body to permit receding movement of the cutter transversely of the body; a slide mounted for movement longitudinally of the tool body; operative connections between said slide and the cutter to effect the desired receding movement of the cutter during relative movement in one direction of the slide relative to the tool body; spring means for exerting yielding pressure upon the slide in the opposite direction; a chamfering cutter mounted on the front end of the slide to engage and chamfer the work when the tool body and work are given relative rotational and axial movements in the thread-cutting operation, said chamfering cutter being formed to provide a non-cutting abutment for the end of the work after the chamfering cut is completed; and a spring-pressed latch device carried by the tool body, said device having a cam surface adapted in one position of adjustment to engage a corresponding cam surface on the slide to yieldingly hold the slide against axial movement relative to the tool body during chamfering of the work and the said latch being adapted in another position of adjustment to engage a shoulder formed on the slide and positively hold the slide in a cutter-retracted position against the pressure of the slide spring.

7. In apparatus for cutting external taper threads, the combination of an axially-chambered tool body; a thread-forming cutter operatively mounted on the tool body to permit receding movement of the cutter transversely of the body; means operatively supported by the tool body for causing such movement of the cutter, said means comprising a structure movably mounted on the body and operatively connected to the cutter, a work-engaging slide mounted for axial movement on the tool body, a chamfering cutter mounted on the front end of the slide to engage and chamfer the work when the tool body and work are given relative rotational and axial movements, devices forming an operative connection between the said structure and the said slide and operable by relative axial movement of the tool body and the work gradually to move the said structure to effect gradual retraction of the cutter relative to the work during the thread-forming operation; mechanism operable at the end of the thread-forming operation rapidly to further retract the cutter, the latter mechanism comprising a spring-actuated abutment for the said connecting devices movably supported by the tool body, a disengageable latch device for holding the abutment against movement by its actuating spring relative to the tool body, and means for disengaging the latch at the end of the thread-forming operation to permit movement of the abutment and the consequent further retraction of the cutters, the last named means being adjustable to vary the point in the relative movement of the tool body and the work at which the cutter is rapidly retracted and thereby vary the length of the thread cut and being adapted by its adjustment to simultaneously correspondingly move the cutter-actuating structure; and means movably interposed between the slide and the tool body adapted by its engagement with the slide to prevent axial movement thereof relative to the tool body during the first part of the relative movement of the tool body and work and thus permit the chamfering of the work in advance of the retraction of the cutters.

8. In thread-cutting apparatus, the combination of a tool body having in operation axial and rotational movement relative to the work to be threaded; a thread-forming cutter movably mounted on the body to permit retraction of the cutter at the end of the thread-forming operation; means movably supported by the tool body and serving when rapidly moved to rapidly retract the cutter; pressure means acting on the retracting means and tending by pressure thereon to effect rapid movement thereof and corresponding rapid retraction of the cutter; holding means interposed between the tool body and the retracting means for holding the latter from the said rapid movement, said holding means comprising a member movable in operation by a part only of the entire static force of the said pressure means from an operative to an inoperative position and movably mounted detent means acting in one position to oppose and prevent movement of the said member by the pressure means; and means acting at the end of the thread-forming operation to move the detent means to inoperative position and thereby permitting movement of the said member to inoperative position.

9. Thread-cutting apparatus as claimed in claim 8 in which the movable holding member is pivotally mounted and in operation is subjected by the force of the pressure means to a turning movement to move the member to inoperative position.

10. Thread-cutting apparatus as claimed in claim 8 in which the detent means is subjected through the holding means to a part only of the full force of the pressure means.

11. Thread-cutting apparatus as claimed in claim 8 in which the parts of the holding means are constructed and arranged in relation to the tool body and the movable retracting means so that movement of the movable retracting means occurring during disengagement of the detent from the movable member of the holding means by reason of wear of the mutually engaging parts of said detent and movable member is substantially less than the said wear.

12. Thread-cutting apparatus as claimed in claim 8 in which the movable member of the holding means constitutes one of the two links of a toggle and the detent of the holding means is arranged to engage the toggle near the middle joint thereof to hold the toggle against collapse under the force of the pressure means.

13. Thread-cutting apparatus as claimed in claim 8 in which the movable holding member when in operative position positively locks the retracting means against movement both in the retracting direction and in the opposite direction.

14. In pipe-threading apparatus of the receding chaser type, the combination of an axially chambered tool body; a thread-forming cutter operatively mounted on the tool body to permit receding movement of the cutter transversely of said body; a work-engaging slide mounted for movement axially of the tool body; operative connections between the said slide and the cutter to effect the desired receding movement of the cutter during relative movement of the tool body and slide; means for discharging cutting oil in the region of the cutter; and a stopper device mounted on the front end of the said slide in advance of the work-engaging part thereof and in position to enter and close the end of the pipe to be threaded before the pipe enters the zone into which the cutting oil is discharged when the tool body and pipe are given relative axial movement to initiate the thread-forming operation and to withdraw from the pipe after the latter leaves said zone.

15. In pipe-threading apparatus of the receding chaser type, the combination of an axially chambered tool body; a thread-forming cutter operatively mounted on the tool body to permit receding movement of the cutter transversely of said body; a work-engaging slide mounted for movement axially of the tool body; operative connections between the said slide and the cutter to effect the desired receding movement of the cutter during relative movement of the tool body and slide; a chamfering cutter mounted on the front end of the slide to engage and chamfer the work when the tool body and work are given relative rotational and axial movements; a stopper device mounted on the front end of the said slide in advance of the chamfering cutter and in position to enter and close the end of the pipe to be threaded when the tool body and work are given relative axial movement to initiate the cutting operations; and means interposed between the tool body and the slide for preventing cutter-retracting movement of the slide relative to the tool body while the stopper device is entering the pipe and the chamfering operation is being performed and then automatically releasing the slide for such cutter-retracting movement.

WILLIAM L. BENNINGHOFF.